US012583488B2

(12) United States Patent
Brant et al.

(10) Patent No.: US 12,583,488 B2
(45) Date of Patent: Mar. 24, 2026

(54) OPENING STOP DEVICE FOR RAILWAY FREIGHT CAR DOOR OUTLET GATES

(71) Applicant: A. Stucki Company, Moon Township, PA (US)

(72) Inventors: Neil Aaron Brant, Oakdale, PA (US); James Scott Kennedy, Zelienople, PA (US); Joseph Jeffrey Dawson, McDonald, PA (US)

(73) Assignee: A. Stucki Company, Moon Township, PA (US)

( * ) Notice: Subject to any disclaimer, the term of this patent is extended or adjusted under 35 U.S.C. 154(b) by 750 days.

(21) Appl. No.: 17/866,971

(22) Filed: Jul. 18, 2022

(65) Prior Publication Data

US 2023/0019629 A1 Jan. 19, 2023

Related U.S. Application Data

(60) Provisional application No. 63/203,290, filed on Jul. 16, 2021.

(51) Int. Cl.
*B61D 7/26* (2006.01)
*B61D 49/00* (2006.01)
(Continued)

(52) U.S. Cl.
CPC ............... *B61D 7/26* (2013.01); *B61D 49/00* (2013.01); *E05B 41/00* (2013.01); *E05F 11/02* (2013.01);
(Continued)

(58) Field of Classification Search
CPC . B61D 7/26; B61D 49/00; E05B 41/00; E05F 11/02; E05Y 2201/716; E05Y 2201/722; E05Y 2800/10; E05Y 2900/51
See application file for complete search history.

(56) References Cited

U.S. PATENT DOCUMENTS 2,641,199 A * 6/1953 Binet ....................... B61D 7/16 292/108
2,891,487 A * 6/1959 Hankins ................... B61D 7/16 292/132
(Continued)

OTHER PUBLICATIONS

International Search Report for PCT/US2022/037415 dated Dec. 16, 2022.
(Continued)

*Primary Examiner* — Jason C Smith
(74) *Attorney, Agent, or Firm* — Buchanan Ingersoll & Rooney PC

(57) ABSTRACT

Disclosed is a hopper car gate assembly including a frame configured for attachment to a hopper car body. The frame defines an opening and includes a beam, wherein the beam has a slot formed therein. A stop plate is removably attached to the beam to selectively obstruct the slot. The assembly has a door supported by the frame. A stop block is attached to the door, wherein the stop block is located on the door such that when the door is inserted into the frame the stop block is aligned with the slot. With the stop plate attached to the beam, the stop block engages with the stop plate to define an open position and prevent further movement of the door in the open direction. With the stop plate detached from the beam, the stop block passes through the slot to allow removal of the door from the frame.

17 Claims, 6 Drawing Sheets

(51) Int. Cl.
*E05B 41/00* (2006.01)
*E05F 11/02* (2006.01)

(52) U.S. Cl.
CPC ... *E05Y 2201/716* (2013.01); *E05Y 2201/722* (2013.01); *E05Y 2800/10* (2013.01); *E05Y 2900/51* (2013.01)

(56) References Cited

U.S. PATENT DOCUMENTS

| | | | | | |
|---|---|---|---|---|---|
| 4,213,725 | A * | 7/1980 | Knippel | B61D 7/18 292/216 |
| 4,224,879 | A * | 9/1980 | Van Auken | B61D 7/26 105/308.1 |
| 4,342,267 | A * | 8/1982 | Blout | B61D 7/26 105/282.2 |
| 4,450,773 | A * | 5/1984 | Fritz | B61D 7/20 105/282.2 |
| 5,272,987 | A * | 12/1993 | Lucas | B60P 1/56 105/308.1 |
| 5,671,684 | A * | 9/1997 | Lucas | B61D 7/26 105/310 |
| 7,171,907 | B2 * | 2/2007 | Early | B61D 7/30 105/247 |
| 2006/0249047 | A1 * | 11/2006 | Fortuna | B61D 7/26 105/282.1 |
| 2012/0072017 | A1 * | 3/2012 | Kim | B65B 57/20 700/231 |
| 2019/0176855 | A1 * | 6/2019 | Dolnik | B61D 7/26 |
| 2023/0019629 | A1 * | 1/2023 | Brant | B61D 49/00 |

OTHER PUBLICATIONS

Written Opinion of the International Searching Authority for PCT/US2022/037415 dated Dec. 16, 2022.

* cited by examiner

OPENING STOP DEVICE FOR RAILWAY FREIGHT CAR DOOR OUTLET GATES

CROSS-REFERENCE TO RELATED APPLICATIONS

This patent application claims the benefit of and priority to U.S. Provisional Patent Application No. 63/203,290, filed on Jul. 16, 2021, the entire contents of which is incorporated by reference in its entirety.

FIELD OF THE INVENTION

Embodiments relate to a hopper car gate assembly for attachment to a hopper car body. The frame defines an opening and includes a beam adjacent the opening, wherein the beam has a slot formed therein. A stop plate is removably attached to the beam to selectively obstruct the slot. The assembly has a door supported by the frame with a stop block attached to the door, wherein the stop block is located on the door such that when the door is inserted into the frame the stop block is aligned with the slot

BACKGROUND OF THE INVENTION

A railcar outlet gate is designed to be mounted on the underside of a hopper car to allow commodity to empty from the car when desired. It has a door that slides horizontally to allow the commodity to flow through an opening when open and does not allow commodity to flow through said opening when closed. Generally, the door is moved by turning a capstan that turns an operating shaft to operate a pinion that engages with a rack on the door. A lock is provided to keep the door from opening unintentionally when door is in the fully closed position.

Conventional railcar outlet gate systems are designed to require removal of the operating shaft to remove or maintenance the door. This is a time-consuming and arduous task. In addition, conventional systems generally include a mechanical stop mechanism on, or associated with, the rack and pinion assembly. This generates undue wear and tear on the rack and pinion assembly, which may require premature replacement of parts.

Embodiments disclosed herein are directed toward overcoming one or more of the disadvantages discussed above.

SUMMARY OF THE INVENTION

Embodiments relate to a hopper car gate assembly. The assembly includes a frame configured for attachment to a hopper car body. The frame has a door insertion end and a door backing end and first and second opposing sides extending between the door insertion and backing ends. The frame defines an opening positioned between the first and second sides. The frame includes a beam positioned at the door insertion end extending between the first and second sides. The beam has a slot formed therein in a direction generally parallel to the first and second sides. The assembly has a stop plate removably attached to the beam to selectively obstruct the slot. The assembly has a door supported by the frame adjacent the opening, wherein the door is horizontally moveable between open and closed positions. The door includes a distal end positioned adjacent the door backing end of the frame when the door is in a closed position. A stop block is attached to a bottom surface of the door, wherein the stop block is located on the door such that when the door is inserted into the frame the stop block is aligned with the slot. When the door is moved in an open direction, with the stop plate attached to the beam, the stop block engages with the stop plate to define the open position and prevent further movement of the door in the open direction. When the door is moved in an open direction, with the stop plate detached from the beam, the stop block passes through the slot to allow removal of the door from the frame.

The assembly includes an operating shaft attached to the frame at the door insertion end and extending between the first and second sides. The operating shaft is configured to drive horizontal movement of the door between the open and closed positions. The assembly has a capstan located at a distal end of the operating shaft and a cam formed on the capstan or on the operating shaft, the cam including a timing indicator thereon. The timing indicator includes a mark or formation identifying a rotational orientation of the operating shaft for proper insertion of the door to a fully closed and locked position.

In one embodiment, the stop block is attached at a distal end of the door, but may be attached positions depending on a desired fully open position.

In some embodiments, the assembly includes a latch shaft including a cam follower and a door latch. The cam follower is configured to engage the cam. The cam follower causes the latch shaft and the door latch to move in reciprocal motion when the cam is caused to rotate.

Since the door may be removed without removal of the operating shaft the timing indicator ensure proper insertion of the door. When the door is inserted into the opening and the operating shaft is positioned to a predetermined orientation, via visual observation of the timing indicator, and the door is translated to a closed position within the opening, the door latch engages a distal edge of the door to lock the door.

In some embodiments, the frame includes an operating shaft position mark. A predetermined orientation of the operating shaft is identified when the timing indicator is aligned with the operating shaft position mark.

In some embodiments, the assembly includes an operating shaft attached to the frame at the door insertion end and extending between the first and second sides, the operating shaft is configured to drive horizontal movement of the door between the open and closed positions. The assembly also includes a pinion attached to the operating shaft, and the door includes a rack configured to engage the pinion to move the door.

In some embodiments, the assembly includes a lost motion mechanism in mechanical connection with the pinion which is designed to introduce lost motion between the pinion and the operating shaft.

In some embodiments, the frame is sized to prevent further horizontal movement of the door towards the door backing end when the door is translated to a closed position.

In some embodiments, the frame includes a glide configured to interact with the door to reduce friction and wear as the door is translated horizontally.

In some embodiments, the glide comprises ultra-high molecular weight polyethylene.

An exemplary embodiment includes a timing indication device for a hopper car gate assembly having a frame configured for attachment to a hopper car body, the frame having a door insertion end and configured to support a door that is horizontally moveable between open and closed positions via an operating shaft located at the door insertion end, wherein the door is removable from the frame without having to remove the operating shaft from the frame. The timing indication device includes a timing indicator located on a cam or capstan of the operating shaft. The timing indicator includes a mark or formation formed thereon and identifying a rotational orientation of the operating shaft for insertion of the door to permit the door to be inserted to a closed and locked position.

When the door is inserted into the frame while the operating shaft is positioned to a predetermined orientation, via visual observation of the timing indicator, the door is capable of being translated, via the operating shaft, to a fully-closed and locked position within the frame.

In some embodiments, the timing indicator includes an operating shaft position mark formed on the frame alignable with the timing indicator to indicate the rotational orientation of the operating shaft for insertion of the door to permit the door to be inserted to a closed and locked position.

An exemplary embodiment includes a lock indication device for a hopper car gate assembly having a frame configured for attachment to a hopper car body, the frame having a door insertion end and configured to support a door that is horizontally moveable between open and closed positions via an operating shaft located at the door insertion end, wherein the door is removable from the frame without having to remove the operating shaft from the frame, wherein a latch shaft is located at the door insertion end and includes a door latch configured to lock the door in a closed position and a cam follower configured to engage a cam of the operating shaft. The lock indication device includes a lock indicator located on the cam follower. The lock indicator includes a mark or formation identifying a rotational orientation of the latch shaft indicative that the latch shaft, and hence a door latch attached thereto, is in a locked position.

In some embodiments, when the door is inserted into the frame and the door is translated, via the operating shaft, to a closed position within the frame, the door latch engages a distal edge of the door to lock the door. Visual indication is provided by the lock indicator.

In some embodiments, when the door latch engages a distal edge of the door to lock the door, the lock indicator is positioned to a predetermined orientation to indicate that the door latch has engaged the distal edge of the door.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present innovation will be more apparent from the following more particular description thereof, presented in conjunction with the following drawings. Like reference numbers used in the drawings may identify like components.

DETAILED DESCRIPTION OF THE INVENTION

The following description is of exemplary embodiments that are presently contemplated for carrying out the present invention. This description is not to be taken in a limiting sense, but is made merely for the purpose of describing the general principles and features of various aspects of the present invention. The scope of the present invention is not limited by this description.

Figure 1:
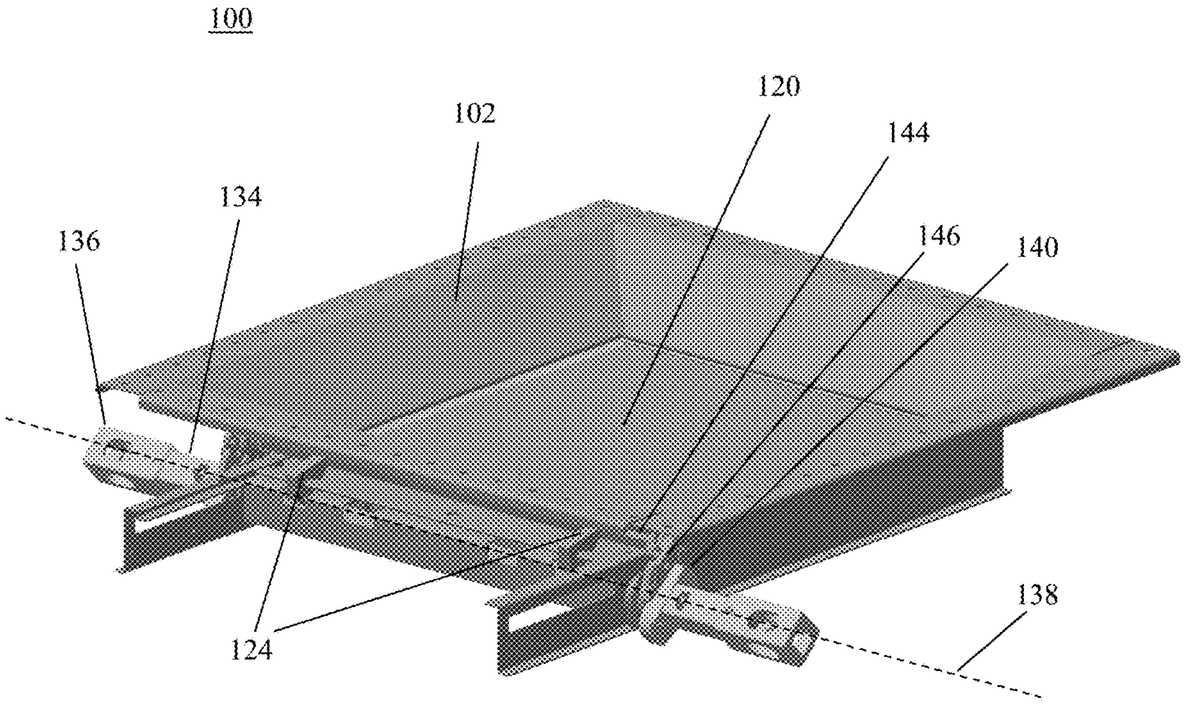
FIG. 1 shows an exemplary hopper car gate assembly with the door in a closed position.
Figure 2:
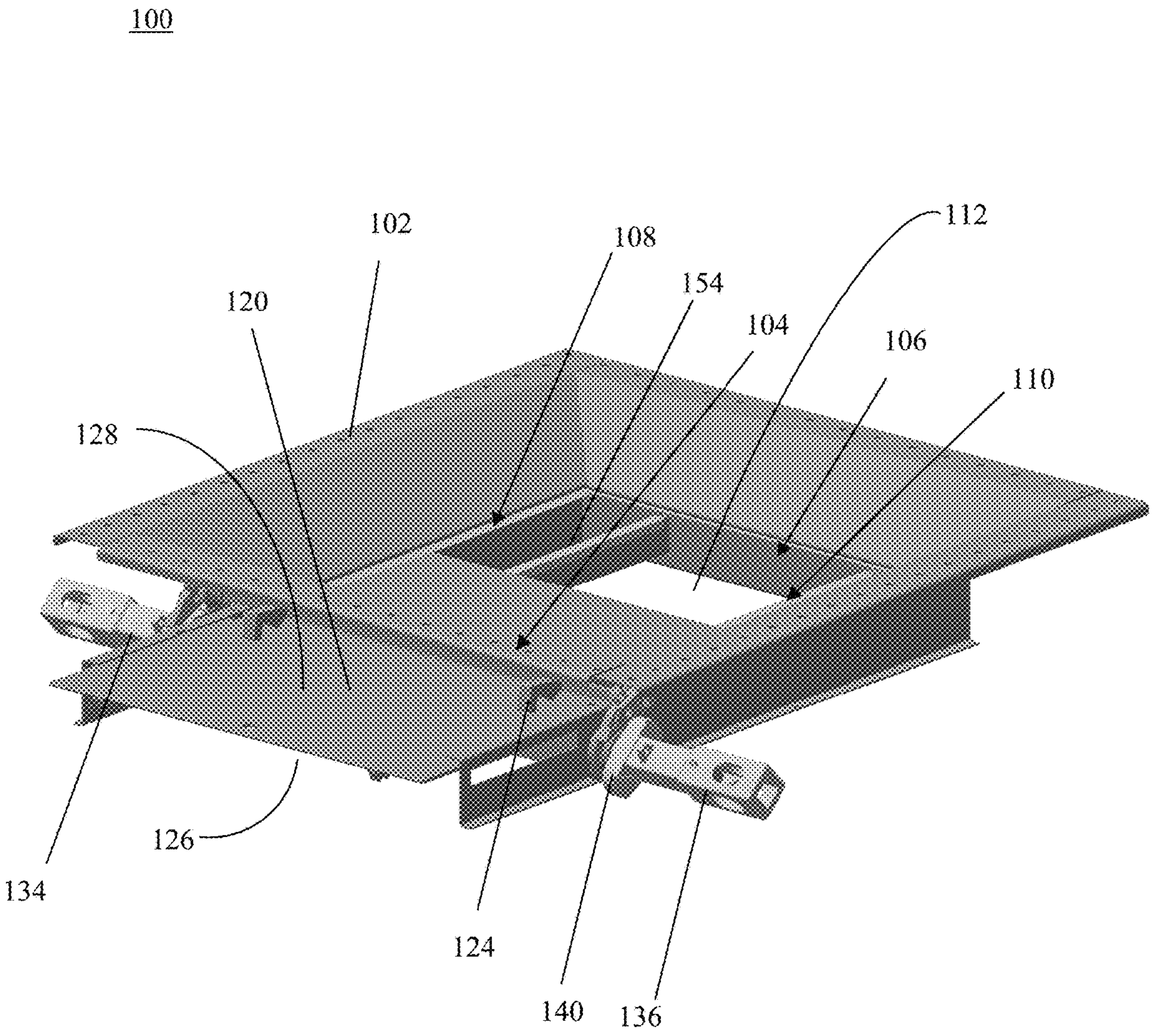
FIG. 2 shows an exemplary hopper car gate assembly with the door in a partially open position.
Figure 3:
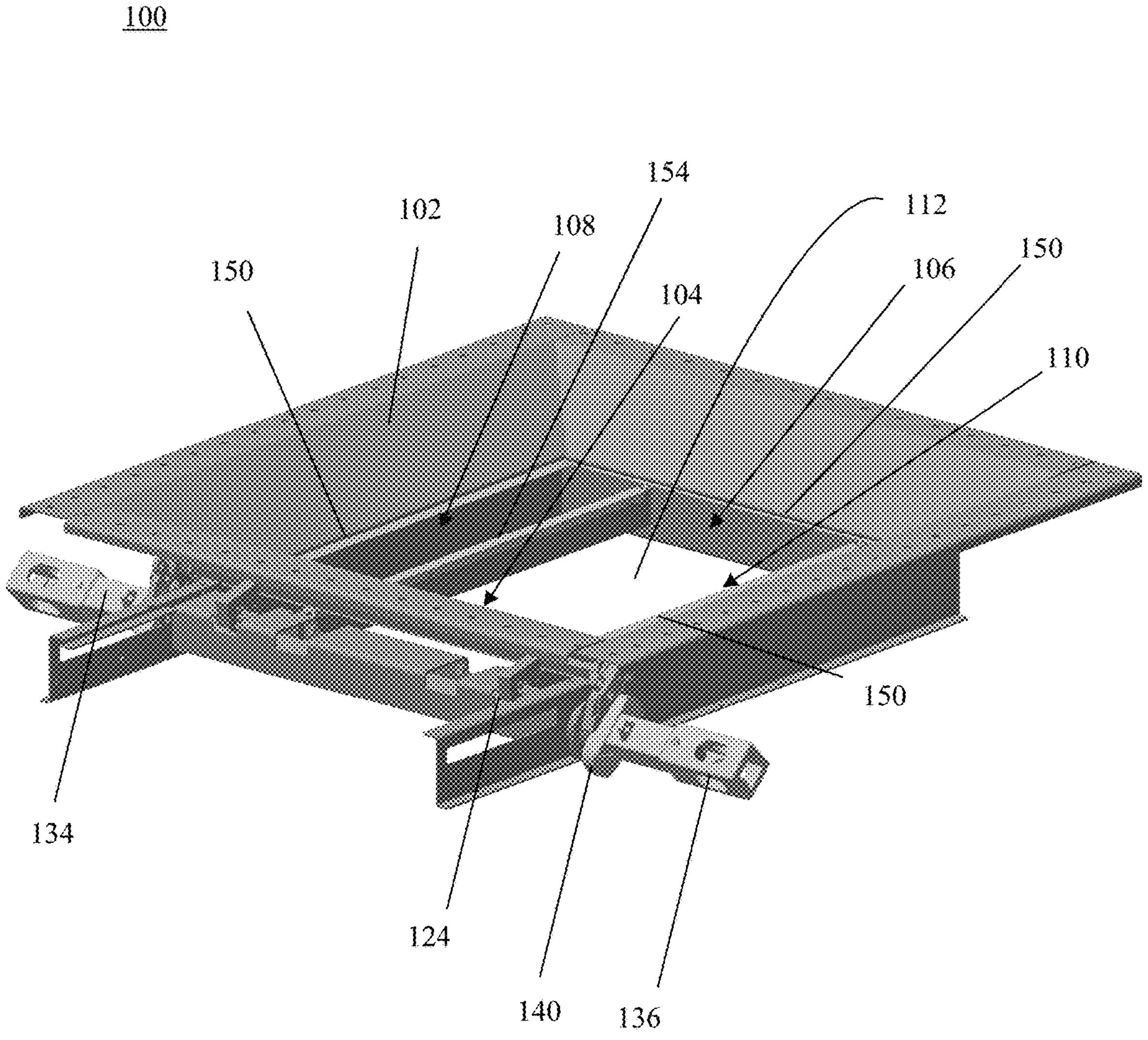
FIG. 3 shows an exemplary hopper car gate assembly with the door removed from the frame.

Referring to FIGS. 1-3, embodiments relate to a hopper car gate assembly 100. The assembly 100 includes a frame 102 configured for attachment to a hopper car body. The frame 102 has a door insertion end 104 and a door backing end 106. The frame 102 also has a first opposing side 108 and a second opposing side 110, the first and second opposing sides 108, 110, extending between the door insertion end 104 and the door backing end 106. The frame 102 defines an opening 112 positioned between the first opposing side 108 and the second opposing side 110. For instance, the frame 102 can be a square or rectangular structure having a square or rectangular opening 112. As will be explained herein, the assembly has a door 120. It is contemplated for the size and shape of the opening 112 to complement that of the door 120.

Figure 4:
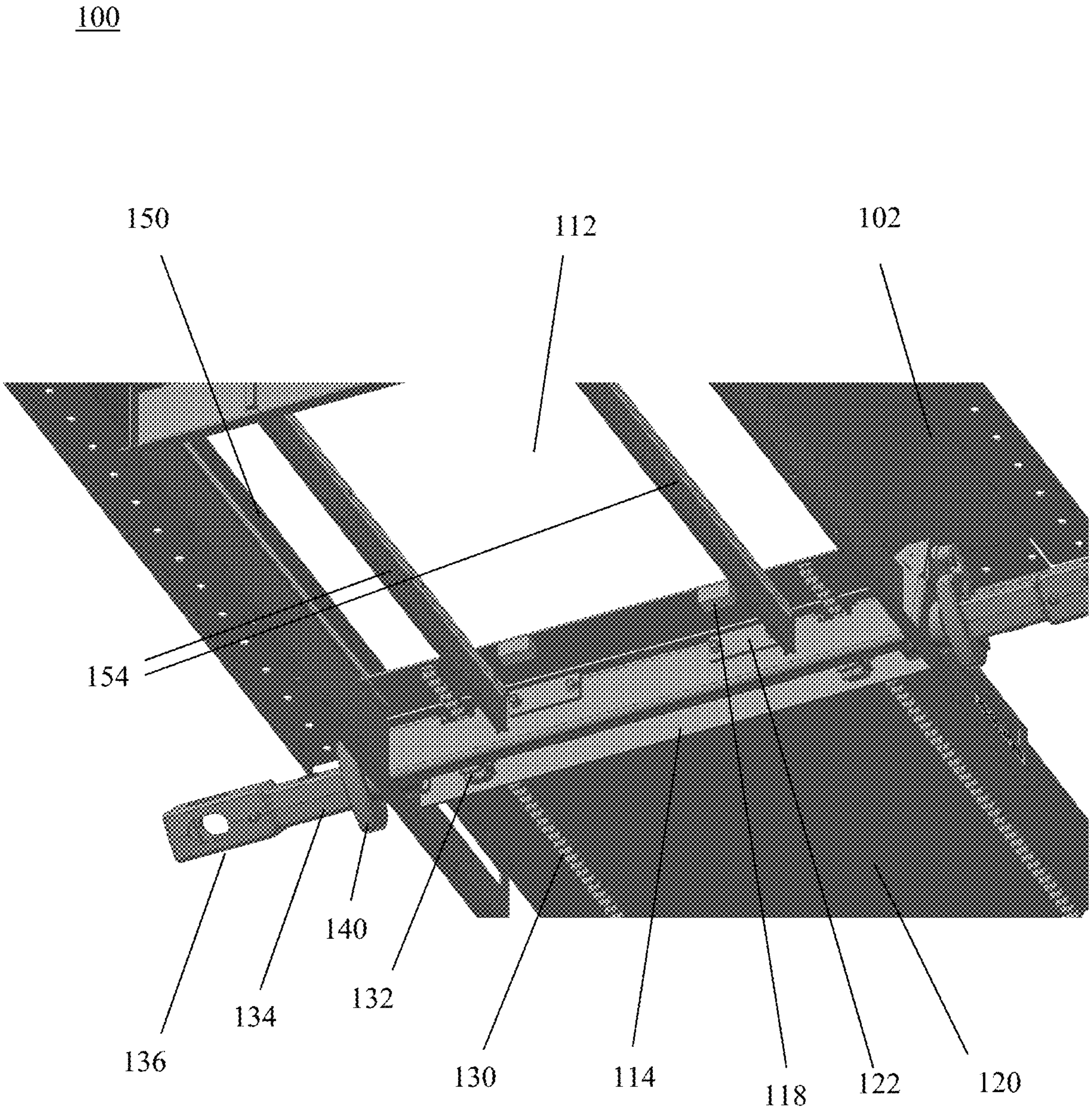
FIG. 4 shows an exemplary hopper car gate assembly viewed from an underside of the assembly and with stop plates attached to a beam of the frame.
Figure 5:
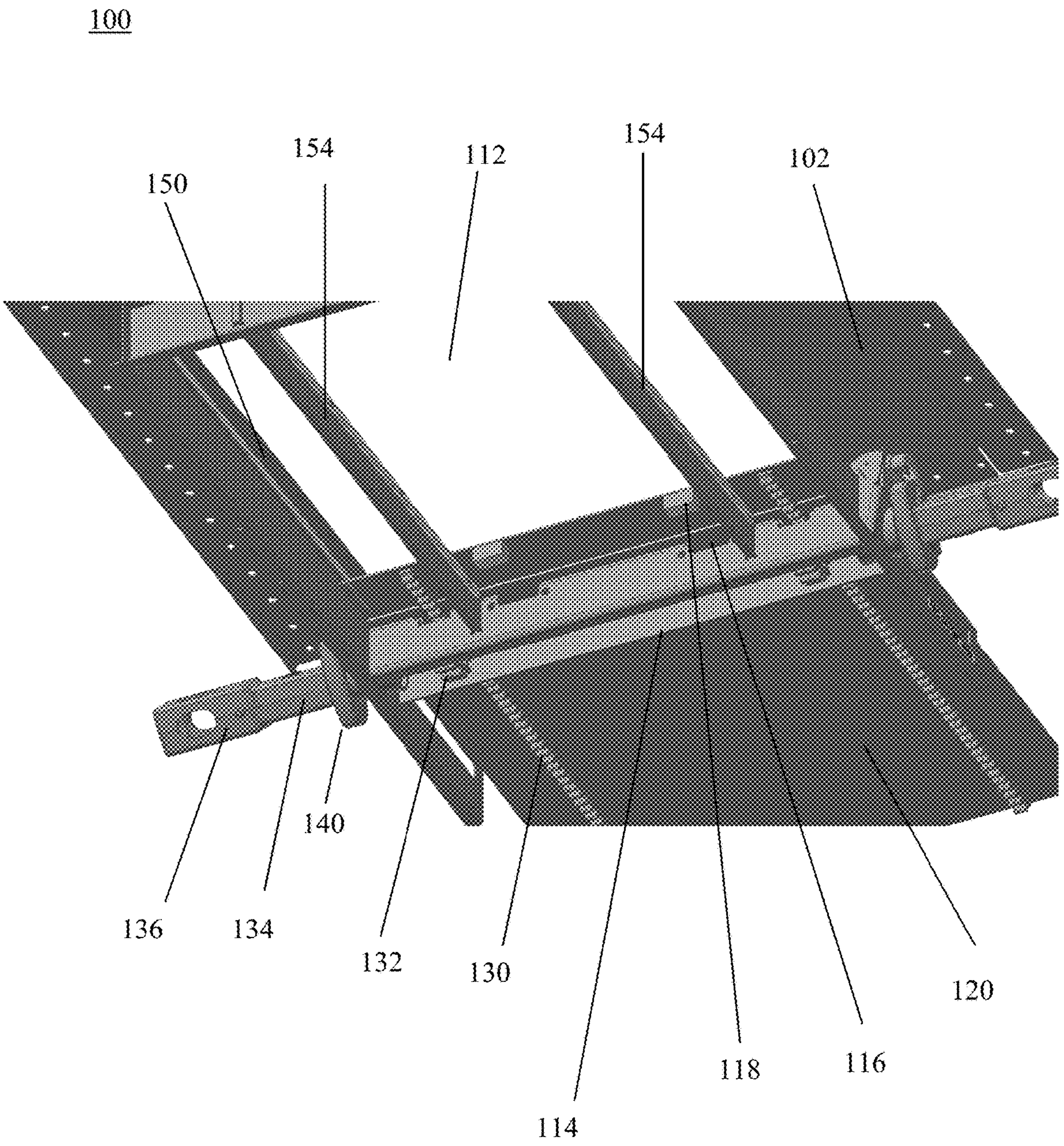
FIG. 5 shows an exemplary hopper car gate assembly viewed from an underside of the assembly and with stop plates removed from a beam of the frame.

Referring to FIGS. 4-5, the frame 102 includes a beam 114 positioned at the door insertion end 104. The beam 114 extends between the first opposing side 108 and the second opposing side 110. The beam 114 can be an elongate member extending between the first opposing side 108 and the second opposing side 110, which can span an entire length, or partially span the entire length, of the frame 102 between the first opposing side 108 and the second opposing side 110.

The beam 114 has at least one slot 116 formed therein. The slot 116 can be formed in a direction parallel, or generally parallel, to the first opposing side 108 and the second opposing side 110. For instance, the opening 112 of the frame 102 can be square or rectangular such that the first opposing side 108 and the second opposing side 110 are parallel to each other. The beam 114 can be orientated to be perpendicular, or generally perpendicular, to the first opposing side 108 and the second opposing side 110. The slot 116 can be formed to be parallel, or generally parallel, to the first opposing side 108 and the second opposing side 110. The slot 116 is a cut-out that extends through the beam 114 so as to create an opening in the beam 114. There can be one or more beams 114, and each beam 114 can have one or more slots 116.

As will be explained herein, the slot 116 is used to allow a stop block 118 attached to a door 120 to be traversed through when the door 120 is slid in a horizontal motion, which can include sliding the door 120 out from the frame 102. Thus, the position of the slot 116 should be such that it is in alignment with the stop block 118 on the door 120 when the door 120 is inserted into the opening 112 of the frame 102. The stop block 118 should be able to slide through the slot 116, and the opening created by the slot 116 should at least accommodate such traverse motion. An exemplary embodiment has two slots 116 formed within the beam 114 and two stop blocks 118 formed on the door 120. For instance, the beam can have a first slot 116 and a second slot 116. The door 120 can have a first stop block 118 (corresponding with the first slot 116) and a second stop block 118

(corresponding with the second slot 116). More or less slots 116 and stop blocks 118 can be implemented The assembly 100 has a stop plate 122 removably attached to the beam 114 to selectively obstruct the slot 116. For instance, the stop plate 122 can a planar member attached to the beam 114 via fasteners (e.g., screws, bolts, etc.). When attached, the stop plate 122 at least partially obstructs the slot 116 such that the stop block 118 cannot pass through. There can be a stop plate 122 for any one or combination of slots 116. In some embodiments, the stop plate 122 can be permanently attached to the beam 114 but configured to selectively obstruct its corresponding slot 116. For instance, the stop plate 122 can be hingedly attached to the beam 114 folding in a downward or sideways direction and a latch mechanism can be used to retain the stop plate 122 in a covered (covering the slot 116) position. As another example, the stop plate 122 can be attached via a slide-track to selectively slide the stop plate 122 over and away from the slot 116. The number of stop plates 122 will generally correspond to the number of slots 116.

The assembly 100 has a door 120 supported by the frame 102. The door 120 is a planar member (e.g., square or rectangular), and is horizontally moveable between open and closed positions. For instance, the door 120 can be translated in a horizontal motion to and from the door insertion end 104 and a door backing end 106. Movement towards the door insertion end 104 is movement towards an open position. Movement towards the door backing end 106 is movement towards a closed position. A closed position can be defined as a position of the door 120 that blocks commodity from passing through the opening 112 of the frame 102. It is contemplated for the closed position to be such that the door 120 obstructs the entire opening 112. The frame 102 can be sized to prevent further horizontal movement of the door 120 towards the door backing end 106 when the door is translated to a closed position. For instance, the door 120 includes a distal end positioned adjacent the door backing end 106 of the frame 102 when the door 120 is in a closed position. The distal end of the door 120 can abut against the door backing end 106 when in the closed position. A door latch 124 (see FIGS. 1-3) is provided to lock the door 120 in a closed position.

An open position can be defined as a position of the door 120 that allows commodity to pass through the opening 112 of the frame 102. It is contemplated for the open position to include a full-open position, which is a door 120 position that does not obstruct any portion of the opening 112 (or a very minimal amount). The full-open position can further include a door 120 position in which the stop block(s) 118 of the door 120 engage the stop plate(s) 122 of the beam 114. When the stop plate(s) 122 are removed, the door 120 can be further translated towards the door insertion end 104 so that the stop block(s) 118 pass through the slot(s) 116 to remove the door 120 from the frame 102.

In the exemplary embodiment, the stop block(s) 118 is/are attached to a bottom surface 126 of the door 120. The positioning of the stop block(s) 118 and the corresponding slot(s) 116 in the beam 114 should be such that the stop block(s) 118, when the door 120 is inserted into the frame 102, is/are aligned with the slot(s) 116 in the beam 114. When the door 120 is moved in an open direction, with the stop plate(s) 122 attached to the beam 114, the stop block(s) 118 engage with the stop plate(s) 122 to define an open position and prevent further movement of the door 120 in the open direction. When the door 120 is moved in an open direction, with the stop plate(s) 122 detached from the beam 114, the stop block(s) 118 passes through the slot(s) 116 to allow removal of the door 120 from the frame 102.

Removal of the door 120 can be achieved by sliding the door 120 from the frame 102 so that the entire door 120 exits the door insertion end 104. The door 120 can be inserted by sliding the door 120 into the frame 102 via the door insertion end 104, and further sliding the door 120 so that the stop block(s) 118 pass through the slot(s) 116. Once the door 120 is inserted and the stop block(s) 118 pass through the slot(s) 116, the stop plate(s) 122 can be reattached or otherwise made to obstruct the slot(s) 116. As can be appreciated, the stop block/stop plate arrangement allows for quick and easy removal and insertion of the door 120 during maintenance and repair operations. In addition, the stop block/stop plate arrangement provides for a mechanical stop mechanism (defining a full-open position) that does not impart undue stress and strain on the rack 130 and pinion 132 (to be discussed later). The stop block/stop plate arrangement also obviates the need to remove the operating shaft 134 during removal and insertion of the door 120.

As described above, embodiments of the assembly 100 include the stop block/stop plate arrangement to provide a mechanical stop mechanism. In addition to the stop block/stop plate arrangement, embodiments of the assembly 100 can include a timing indicator 142. The timing indicator 142 is a component that is associated with the operating shaft 134 and is used to identify a rotational orientation of the operating shaft 134. Thus, the operating shaft 134 can be a part or component within the overall assembly 100.

The operating shaft 134 is attached at the door insertion end 104 and extends between the first opposing side 108 and the second opposing side 110. The operating shaft 134 is a drive shaft that drives horizontal movement of the door 120 between the open and closed positions. The assembly 100 has a capstan 136 located at a distal end of the operating shaft 134. The capstan 136 is configured to allow a user to insert a tool (e.g., a wrench) therein to facilitate rotational motion of the operating shaft 134 about a longitudinal axis 138 of the operating shaft 134—e.g., the capstan 136 can serve as a socket for the tool.

Figure 6:
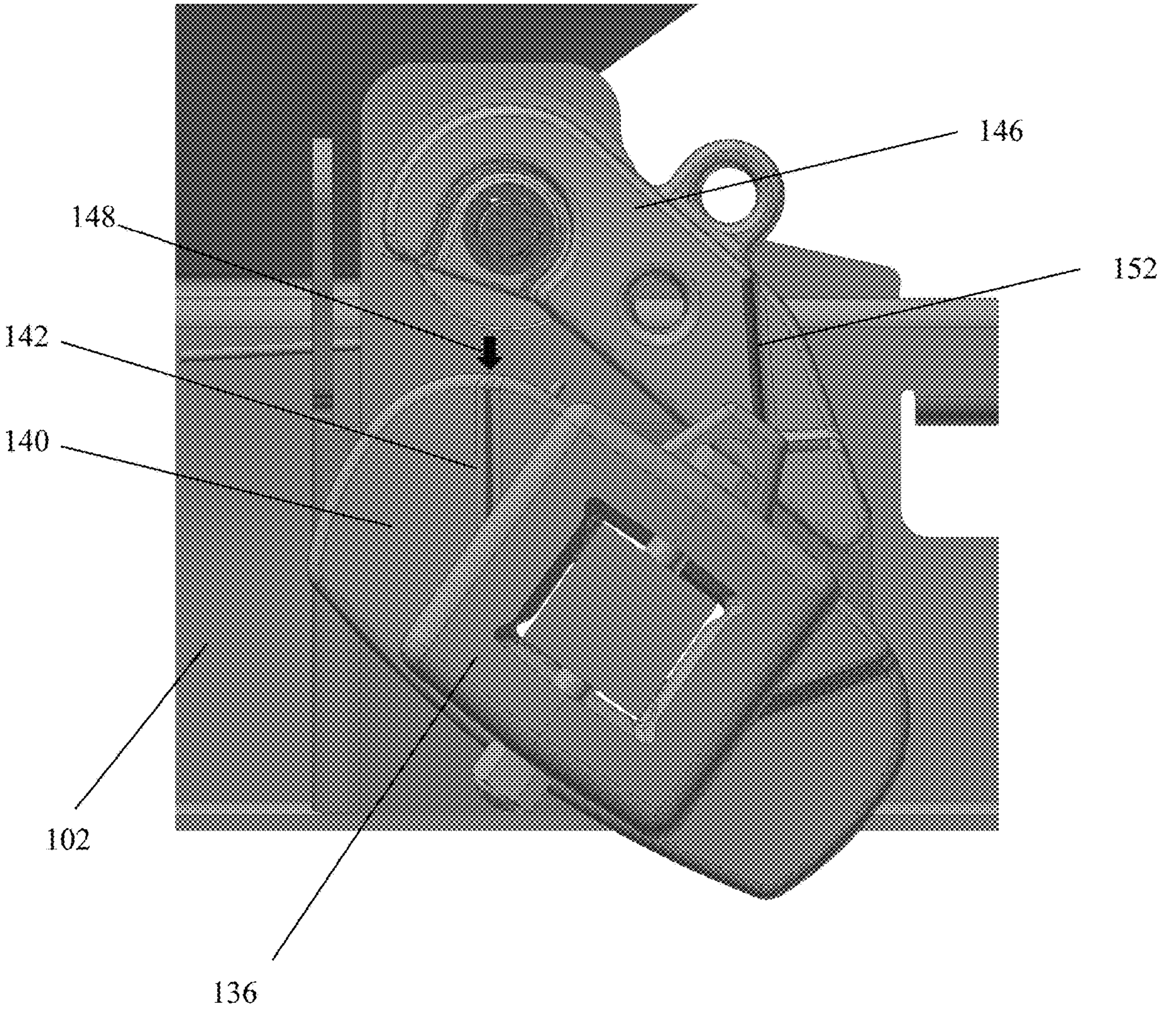
FIG. 6 shows an exemplary timing indicator.

Referring to FIG. 6, the assembly 100 also has a cam 140 formed on the capstan 136 or on the operating shaft 134. The cam 140 can include a timing indicator 142 thereon. The timing indicator 142 includes a mark or formation identifying a rotational orientation of the operating shaft 134. This can be used to assist a user in "timing" the operating shaft 134 during insertion of the door 120. Since the door 120 can be removed without removal of the operating shaft 134, it must be ensured that the operating shaft 134 is properly positioned with the door 120 is inserted so that the latches 124 properly engage to the door to lock the door 120 in a closed position.

An off-timing can result in misalignment of the door 120 when the door 120 is translated to a fully closed position which prevents latching the door 120 via the door latch 124. Ensuring the operating shaft 134 is in a proper orientation can be via visual inspection of the timing indicator 142. For instance, the assembly 100 may be configured such that the timing indicator 142 should be vertically orientated before the door 120 is inserted so that when the door 120 is translated to the fully closed position (via the rotation of the capstan 136), the door 120 fully covers or overlays the opening 112 and the door latch 124 can lock the door 120. Thus, the vertical orientation of the timing indicator 142 implies that the operating shaft 134 is properly orientated before the door 120 is inserted into the frame 102. The vertical orientation of the timing indicator 142 is exemplary, and it should be understood that other orientations can be used—e.g., a horizontal orientation can indicate a proper operating shaft 134 orientation.

Referring back to FIGS. 4-5, in some embodiments, the stop block(s) 118 is/are attached at a distal end of the door 120—e.g., the stop block(s) 118 can be attached to the distal end of the door 120 that is most proximal to the door backing end 106 when the door 120 is inserted into the frame 102. Attaching the stop block(s) 118 at the distal end of the door 120 allows the door 120 to be slid to the fully-open position (e.g., no obstruction of the opening 112) before the stop block(s) 118 abut against the stop plate(s) 122 to have the door's 120 motion arrested.

In some embodiments, the assembly 100 includes a latch shaft 144 (see FIGS. 1-3). The latch shaft 144 can be attached to the frame 102 at the door insertion end 104 and extend between (either partially or fully) the first opposing side 108 and the second opposing side 110. The attachment can allow rotational motion of the latch shaft 144 relative to the frame 102. This can be via a bearing assembly, a race assembly, etc. The latch shaft 144 can have cam follower 146 and at least one door latch 124. The door latch 124 can be an L-shaped or J-shaped member extending from a portion of the latch shaft 144. The cam follower 146 is rigidly attached to the latch shaft 144 and is configured to engage the cam 140. The cam follower 146 causes the latch shaft 144 and the door latch(es) 124 to move in reciprocal motion when the cam 140 is caused to rotate. For instance, rotation of the capstan 136 to drive the operating shaft 134 causes the cam 140 to rotate. The cam 140 rotation causes the cam 140 to engage the cam follower 146 such that the cam follower 146 moves in a reciprocal motion. The cam follower 146 reciprocal motion causes the latch shaft 144 to rotationally oscillate. The rotational oscillation of the latch shaft 144 causes the door latch(es) 124 to move in a reciprocal motion. The door latch(es) 124 will contact and break contact with the top surface 128 and/or bottom surface 126 (depending on the configuration of the latch shaft 144) of the door 120 (e.g., the reciprocal motion will cause the door latch(es) 124 to make and break contact in a repeated manner) until the door 120 is translated to a fully-closed position. In the fully closed position, the door latch(es) 124 will engage with a distal end of the door 120, thereby preventing horizontal movement of the door 120 towards the door insertion end 104. As noted herein, the size and shape of the frame 102 is such that the door 120 engages the door backing end 106 when in the fully-closed position, thereby preventing further movement of the door 120 towards the door backing end 106 when the door 120 is in the fully-closed position. With the timing indicator 142, a user can be assured that the door latch(es) 124 will engage the distal end of the door 120 when in the closed position, provided that the timing indicator 142 is in the proper position before the door 120 is inserted into the frame 102.

When the door 120 is inserted into the door insertion end 104, the operating shaft 134 is rotated (via the capstan 136) to cause the door 120 to translate towards the door backing end 106. As the operating shaft 134 is rotated, the latch shaft 144 rotationally oscillates due to the cam/cam follower arrangement. This rotational oscillation causes the door latch(es) 124 to make and break contact with the top surface 128 and/or bottom surface 126 of the door 120 until the door 120 is translated to the fully closed position, at which time the door latch(es) 124 engage the distal end of the door 120 to lock the door 120 in the fully closed position.

In some embodiments, a lock indication device is provided which includes a lock indicator 152 including a mark or formation on the cam follower 146. The lock indicator 152 identifies a rotational orientation of the latch shaft 144 for positioning of the door latch(es) 124 to a locked position. As noted herein, the cam follower 146 is rigidly attached to the latch shaft 144 and is configured to engage the cam 140. The cam follower 146 causes the latch shaft 144 and the door latch(es) 124 to move in reciprocal motion when the cam 140 is caused to rotate. The door latch(es) 124 will contact and break contact with the top surface 128 and/or bottom surface 126 of the door 120 until the door 120 is translated to a fully-closed position. In the fully closed position, the door latch(es) 124 will engage with a distal end of the door 120, thereby preventing horizontal movement of the door 120 towards the door insertion end 104. When the door latch(es) 124 engage with a distal end of the door 120, the lock indicator 152 will be in a predetermined orientation (e.g., horizontal, vertical, etc.) to serve as a visual indicator to a user that the latch shaft 144 (and the door latch(es) 124) are in a locked position.

In some embodiments, the frame 102 includes an operating shaft position mark 148 (see FIG. 6). Thus, a predetermined orientation of the operating shaft 134 can be identified when the timing indicator 142 is aligned with the operating shaft position mark 148. Exemplary embodiments show the timing indicator 142 being in a vertical position to indicate a proper orientation, but the designated position of the timing indicator 142 that which indicates a proper orientation can be at any position.

In some embodiments, the assembly 100 includes a pinion 132 attached to the operating shaft 134 (see FIGS. 4-5). The door 120 can include a rack 130 configured to engage the pinion 132. The pinion 132 is in mechanical engagement with the operating shaft 134. Rotation of the operating shaft 134 can cause rotation of the pinion 132. The pinion 132, being engaged with the rack 130, forces the door 120 to translate horizontally as the pinion 132 is rotated. It is contemplated for there to be two racks 130 and corresponding two pinions 132; however, there can be any number of racks 130 and pinions 132.

Some embodiments include a lost motion mechanism positioned between the pinion 132 and the operating shaft 134. The lost motion mechanism can be linkage or other mechanics in mechanical connection with the pinion(s) 132 and the operating shaft 134, and be configured to introduce lost motion into the system to allow for unlocking the door 120. For instance, when in the closed positon and locked by the latch shaft 144, it may be desirable to have some play between the latch shaft 144/door latch(es) 124 and the door 120 to allow a user to rotate the latch shaft 144 and disengage the door latch(es) 124 from the door 120 before movement of the door 120 when it is desired to open the door 120. The lost motion mechanism can introduce lost motion for this purpose.

In some embodiments, the frame 102 includes a glide 154 configured to interact with the door 120 to reduce friction and wear as the door 120 is translated horizontally. For instance, the opening 112 of the frame 102 can include glide 154 to retain and guide movement of the door 120 in the horizontal direction. It is contemplated for the glide 154 to be an elongated member that spans the opening 112. The glide 154 can span from the door insertion end 104 to the door backing end 106, or span from the first opposing side 108 and the second opposing side 110. There can be any number of glides 154. An exemplary embodiment shown in FIG. 5 shows the frame 102 having two glides 154, each spanning from the door insertion end 104 to the door backing end 106. In some embodiments, the glide 154 is made of ultra-high molecular weight polyethylene. Alternatively, the glide 154 can be made of metal and have ultra-high molecular weight polyethylene disposed thereon.

Some embodiments can further include a seal 150 disposed on the door 120 or frame 102. (See e.g., FIG. 3). For instance, a portion of the frame 102 at the circumference of the opening 112 can have a seal 150 disposed thereon. The seal 150 is provided and configured to prevent commodity from leaking through the opening 112 when the door 120 is in a closed position.

It should be understood that modifications to the embodiments disclosed herein can be made to meet a particular set of design criteria. For instance, the number of or configuration of components or parameters of the various embodiments may be interchangeably used to meet a particular objective.

It will be apparent to those skilled in the art that numerous modifications and variations of the described examples and embodiments are possible in light of the above teachings of the disclosure. The disclosed examples and embodiments are presented for purposes of illustration only. Other alternative embodiments may include some or all of the features of the various embodiments disclosed herein. For instance, it is contemplated that a particular feature described, either individually or as part of an embodiment, can be combined with other individually described features, or parts of other embodiments. The elements and acts of the various embodiments described herein can therefore be combined to provide further embodiments.

It is the intent to cover all such modifications and alternative embodiments as may come within the true scope of this invention, which is to be given the full breadth thereof. Additionally, the disclosure of a range of values is a disclosure of every numerical value within that range, including the end points. Thus, while certain exemplary embodiments of the device and methods of making and using the same have been discussed and illustrated herein, it is to be distinctly understood that the invention is not limited thereto but may be otherwise variously embodied and practiced within the scope of the following claims.

What is claimed is:

1. A hopper car gate assembly, comprising:

a frame configured for attachment to a hopper car body, the frame having a door insertion end and a door backing end and first and second opposing sides extending between the door insertion and backing ends, wherein the frame defines an opening positioned between the first and second sides, wherein the frame includes a beam positioned at the door insertion end extending between the first and second sides, the beam having a slot formed therein in a direction generally parallel to the first and second sides;

a stop plate removably attached to the beam to selectively obstruct the slot;

a door supported by the frame adjacent the opening, wherein the door is horizontally moveable between open and closed positions, wherein the door includes a distal end positioned adjacent the door backing end of the frame when the door is in a closed position;

a stop block attached to a bottom surface of the door, wherein the stop block is located on the door such that when the door is inserted into the frame the stop block is aligned with the slot, wherein when the door is moved in an open direction:

with the stop plate attached to the beam, the stop block engages with the stop plate to define the open position and prevent further movement of the door in the open direction; and with the stop plate detached from the beam, the stop block passes through the slot to allow removal of the door from the frame.

2. The hopper car gate assembly of claim 1, further comprising:

an operating shaft attached to the frame at the door insertion end and extending between the first and second sides, the operating shaft configured to drive horizontal movement of the door between the open and closed positions;

a capstan located at a distal end of the operating shaft; and a cam formed on the capstan or on the operating shaft, the cam including a timing indicator thereon, wherein the timing indicator includes a mark or formation identifying a rotational orientation of the operating shaft for insertion of the door to a closed and locked position.

3. The hopper car gate assembly of claim 1, wherein the stop block is attached at a distal end of the door.

4. The hopper car gate assembly of claim 2, further comprising:

a latch shaft including a cam follower and a door latch;

wherein the cam follower is configured to engage the cam; and wherein the cam follower causes the latch shaft and the door latch to move in reciprocal motion when the cam is caused to rotate.

5. The hopper car gate assembly of claim 4, wherein:

when the door is inserted into the opening and the operating shaft is positioned to a predetermined orientation, via visual observation of the timing indicator, and the door is translated to a closed position within the opening, the door latch engages a distal edge of the door to lock the door.

6. The hopper car gate assembly of claim 2, wherein:

the frame includes an operating shaft position mark; and a predetermined orientation of the operating shaft is identified when the timing indicator is aligned with the operating shaft position mark.

7. The hopper car gate assembly of claim 1, further comprising:

an operating shaft attached to the frame at the door insertion end and extending between the first and second sides, the operating shaft configured to drive horizontal movement of the door between the open and closed positions;

a pinion attached to the operating shaft; and wherein the door includes a rack configured to engage the pinion.

8. The hopper car gate assembly of claim 1, wherein the frame is sized to prevent further horizontal movement of the door towards the door backing end when the door is translated to a closed position.

9. The hopper car gate assembly of claim 1, wherein the frame includes a glide configured to interact with the door to reduce friction and wear as the door is translated horizontally.

10. The hopper car gate assembly of claim 9, wherein the glide comprises ultra-high molecular weight polyethylene.

11. A timing indication device for a hopper car gate assembly having a frame configured for attachment to a hopper car body, the frame having a door insertion end and configured to support a door that is horizontally moveable between open and closed positions via an operating shaft located at the door insertion end, wherein the door is removable from the frame without having to remove the operating shaft from the frame, the timing indication device comprising:

a timing indicator located on a cam or a capstan of the operating shaft, wherein the timing indicator includes a mark or formation identifying a rotational orientation of the operating shaft for insertion of the door to permit the door to be inserted to a closed and locked position.

12. The timing indication device of claim 11, wherein:

when the door is inserted into the frame while the operating shaft is positioned to a predetermined orientation, via visual observation of the timing indicator, the door is capable of being translated, via the operating shaft, to a fully-closed and locked position within the frame.

13. The timing indication device of claim 11, further comprising:

an operating shaft position mark formed on the frame alignable with the timing indicator to indicate the rotational orientation of the operating shaft for insertion of the door to permit the door to be inserted to a closed and locked position.

14. A lock indication device for a hopper car gate assembly having a frame configured for attachment to a hopper car body, the frame having a door insertion end and configured to support a door that is horizontally moveable between open and closed positions via an operating shaft located at the door insertion end, wherein a latch shaft is located at the door insertion end and includes a door latch configured to lock the door in a closed position and a cam follower configured to engage a cam of the operating shaft, the lock indication device comprising:

a lock indicator located on one of the cam follower and the door latch, wherein the lock indicator includes a mark or formation identifying a rotational orientation of the latch shaft indicative that the latch shaft, and hence the door latch attached thereto, is in a locked position.

15. The lock indication device of claim 14, wherein:

when the door is inserted into the frame and the door is translated, via the operating shaft, to a closed position within the frame, the door latch engages a distal edge of the door to lock the door, with visual indication provided by the lock indicator.

16. The lock indication device of claim 15, wherein:

when the door latch engages a distal edge of the door to lock the door, the lock indicator is positioned to a predetermined orientation to indicate that the door latch has engaged the distal edge of the door.

17. The lock indication device of claim 15, wherein:

wherein the door is removable from the frame without having to remove the operating shaft from the frame.

* * * * *